United States Patent [19]
Chaptal et al.

[11] Patent Number: 6,092,953
[45] Date of Patent: Jul. 25, 2000

[54] PLASTIC PART SLIDABLY MOUNTABLE ON A SUPPORT

[75] Inventors: Patrice Chaptal, Bellignat; Pascal Alberti, Geovresset; William Marcos, Oyonnax; Pascal Barbier, Langres, all of France

[73] Assignee: Compagnie Plastic Omnium, Lyons, France

[21] Appl. No.: 09/025,805

[22] Filed: Feb. 19, 1998

[30] Foreign Application Priority Data

Feb. 19, 1997 [FR] France ................................ 97 01949

[51] Int. Cl.$^7$ ....................................... B32B 3/10
[52] U.S. Cl. ............................ 403/12; 403/28; 296/187; 296/191; 296/198
[58] Field of Search ................................ 403/11, 12, 13, 403/14, 21, 28, 29, 30; 411/84, 85, 546; 296/187, 191, 29, 198

[56] References Cited

U.S. PATENT DOCUMENTS

| | | |
|---|---|---|
| 4,352,521 | 10/1982 | Trenkler .................................. 296/191 |
| 4,438,971 | 3/1984 | Zaydel et al. ............................ 296/191 |
| 4,973,102 | 11/1990 | Bien ....................................... 296/187 |
| 5,098,765 | 3/1992 | Bien ................................... 296/191 X |
| 5,139,306 | 8/1992 | Ott et al. ................................. 296/198 |
| 5,358,302 | 10/1994 | Schoen et al. ........................... 296/187 |
| 5,429,412 | 7/1995 | Schoen et al. ........................... 296/187 |
| 5,636,891 | 6/1997 | Van Order et al. ................... 403/13 X |

FOREIGN PATENT DOCUMENTS 0 346 237A1  12/1989  France .

*Primary Examiner*—Terry Lee Melius
*Assistant Examiner*—John R. Cottingham
*Attorney, Agent, or Firm*—Oliff & Berridge, PLC

[57] ABSTRACT

The invention relates to a plastic part having at least one thin wall, and designed to be slidably mounted on a support by its thin wall and having, in this thin wall: an elongate through-opening, having two lengthwise edges that are substantially parallel at least over part of their length; a spacer whose thickness is greater than that of the thin wall, able to slide in the opening between the two lengthwise edges thereof; and means of holding the spacer to the support while keeping the spacer inside the opening. Spacer can be connected to thin wall by deformable or breakable links.

10 Claims, 4 Drawing Sheets

PLASTIC PART SLIDABLY MOUNTABLE ON A SUPPORT

BACKGROUND OF THE INVENTION

The present invention relates to a plastic part that is slidably mountable on a support.

It is known that the body parts of an automobile are attached to the automobile structure by mounts that hold them in position during all the phases of automobile manufacture subsequent to their installation and throughout the life of the automobile.

It is also known that one of the automobile manufacturing steps subsequent to the installation of body parts is the cataphoresis step which includes immersing the entire automobile in a bath, body parts included, then placing the automobile in an oven at a temperature of approximately 180° C. and 220° C. in order to rustproof the automobile structure and all the metal parts it includes, as well as the painting that includes a baking period at a temperature of approximately 140° C. and 170° C.

These operations are specified for body parts made of sheet metal.

On the other hand, body parts made of plastic do not withstand such treatments well, particularly that in which the paintwork is baked.

During such heating, the plastic parts expand to far greater degrees than those to which the automobile structure expands so that there is a substantial expansion differential between the automobile structure and the body parts attached thereto. Because of this, the plastic body parts deform and buckle or ripple, adversely affecting the appearance of the automobile.

Moreover, expansion differentials appear during the life of the automobile so that the parts can reach temperatures of approximately 80° C., something which must also be taken into account when the body parts are attached to the automobile structure.

Finally, another problem appears due to the shrinkage of the thermoplastic parts, once they have been heated, over time, a phenomenon known as post-shrinkage, resulting in displacement of the body parts relative to the automobile structure, independently of the expansion differential phenomena.

To overcome these drawbacks, mounts are used that allow relative sliding of a body part relative to the automobile structure. Such mounts are known as "sliding mounts."

However, known sliding mounts have numerous drawbacks, including:

their cost, which is fairly high, the fact that, when body parts are installed on the automobile structure, it is necessary to pre-position them to engage the mounting elements in their accommodations.

The goal of the present invention is to provide a body part having an integrated mounting system, allowing it to avoid the drawbacks listed above, while having other advantages that will emerge from the description hereinbelow.

SUMMARY OF THE INVENTION

The present invention relates to a plastic part having at least a thin wall, and designed to be slidably connected to a support by its thin wall and having, in this thin wall: an elongate through-opening having two lengthwise edges that are substantially parallel at least over a portion of their length; a spacer whose thickness is greater than that of the thin wall capable of sliding in the opening between the two lengthwise edges thereof; and means for holding the spacer on the support while keeping said spacer inside the opening, the plastic part being characterized in that in that the spacer is initially connected to the thin wall by deformable or breakable links.

According to the invention, "thin wall" is understood to be a portion of the part that is very small relative to its other dimensions.

In the description of the invention provided above, the adverb "initially" designates a time interval during which the plastic part is made but has not yet been used, namely connected to the support.

It will be understood that the plastic part according to the invention, which can be a body part for example, has, in its wall, an elongate opening that forms a type of window, inside which is an element that is thicker than the wall at the location of the opening and which has dimensions such that, when it is fitted in the opening, it can move in the opening only in the lengthwise direction thereof, the element moreover constituting a spacer in the sense that, when the body part is mounted, the means is tightened, for example, against the element and holds the wall of the part by the thickness of the element, the means not however being tightened against the wall, because of the element comprising the spacer.

Preferably, the surface of the spacer offering a support for the holding means against the spacer is sufficient to prevent any creep of the spacer, even when the temperature of the latter rises. This surface is chosen according to the desired conditions and to the material used.

The choice of an appropriate supporting surface in particular avoids resorting to a lock washer that is usually used to keep bolts tight if the spacer is connected to the support by a bolt.

In one embodiment of the invention, the spacer is initially located outside the opening, but opposite the latter so that it occupies the opening when the part is connected to the support.

This embodiment facilitates the molding of the plastic part and the spacer, as the mold can thus delimit both the impression of the edges of the opening in the thickness of the thin wall of the part and also the impression of the spacer in the vicinity of the opening.

Indeed, it would be very difficult if not impossible to delimit the impression of the spacer inside the impression of the edges of the opening. This would require the mold to have an extremely thin wall between these two impressions, the thickness of the wall corresponding to the necessary play between the spacer and the opening, since, in a plane perpendicular to the lengthwise direction of the opening, the dimensions of the spacer are very slightly less than those of the opening, since there is only slight play between the spacer and the lengthwise edges of the opening.

In a first embodiment of the invention, the links between the spacer and the thin wall are comprised of flexible arms connecting the spacer to each of the ends furthest from the opening.

Such arms are preferably formed when the plastic part and the spacer are molded.

They are advantageously designed to keep the spacer in a predetermined position inside the opening when the plastic part is not connected to the support, which ensures that the spacer is pre-positioned.

This predetermined position is such that the spacer can move in a first direction in the opening to offset post-shrinkage of the thermoplastic material and in a second direction, opposite the first, to offset expansion differentials between the thermoplastic part and the automobile structure.

Since the differences in expansion are preponderant, the path available to the spacer in the opening in the second direction is longer than that available in the first direction.

In a second embodiment of the invention, the spacer is initially located outside the opening, but is opposite the latter, and the links are comprised of areas with small cross-sections connecting the spacer to the lengthwise edges of the opening so that, when the plastic part is connected to the support, the areas break by shearing.

Thus, the spacer is pre-positioned at the time it is attached to the support, but the connection of the spacer to the support causes the spacer to penetrate the opening, which subjects the areas with small cross sections to shear, thus breaking them. The spacer is then totally disconnected from the wall.

In a preferred embodiment of the invention, the means for holding the spacer to the support, while keeping said spacer inside the opening, comprises a substantially plane mask able to cover the opening in its entirety and be tightened against the spacer by a tightening element anchored in the support, for example a bolt passing thorough the mask and the spacer and screwed into the support, or a threaded pin integral with the mask and passing through the spacer and the support, a nut being threaded onto this pin on the other side of the support.

Such a mask may, for example, be made of polyamide alloy.

BRIEF DESCRIPTION OF THE DRAWINGS

For better understanding of the invention, nonlimiting embodiments will now be described, with a reference to the attached drawings wherein.

DETAILED DESCRIPTION OF PREFERRED EMBODIMENTS

Figure 1:
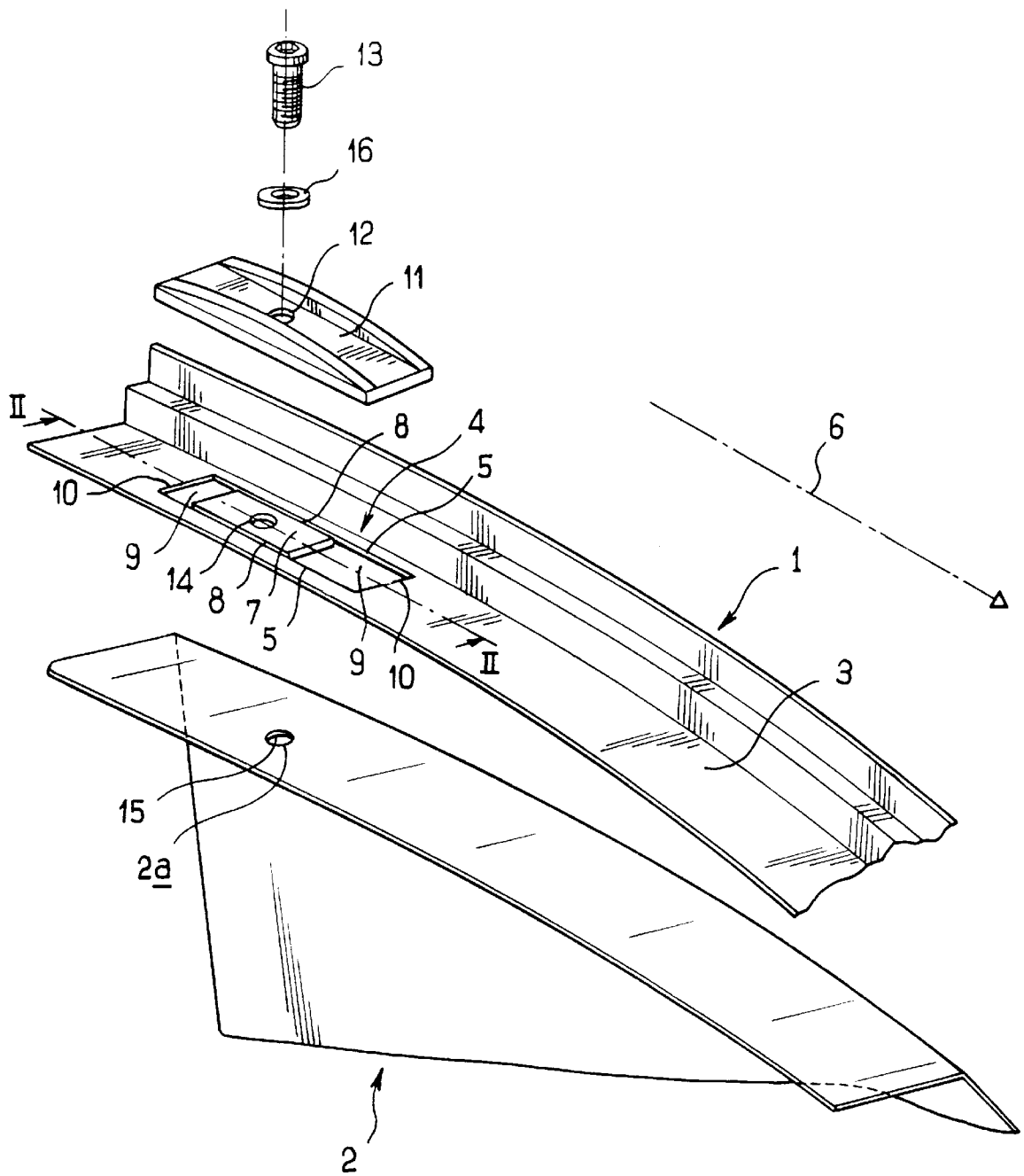
FIG. 1 is a perspective view of an automobile fender according to a first embodiment.

FIG. 1 shows an upper portion of a front left fender 1 of an automobile and an upper portion of a structural part of this automobile, which serves as a support 2 for the fender 1.

The fender 1 has a thin wall 3 in which a rectangular through-opening 4 is provided with longer sides, or lengthwise edges 5, of the opening 4 being parallel to a lengthwise direction of the automobile shown by arrow 6.

A paralellepipedic part constituting a spacer 7 as defined by the invention is accommodated inside the opening 4. In a plane of the thin wall 3, it has a rectangular section whose width is slightly less than that of opening 4 and whose length is far less than that of opening 4.

Thus, there is a small amount of play 8 between spacer 7 and lengthwise edges 5 and large spaces 9 located between the spacer 7 and each of a pair of furthest end edges 10 of the opening 4.

The large spaces 9 allow relative displacement of spacer 7 in the opening 4 over a path equal to approximately the sum of the lengths of the spaces, the path being selected to correspond to an expansion differential provided between the fender 1 and the support 2 in one direction and to post-shrinkage in the other direction, while the small amounts of play 8 prevent any rotation of the spacer 7 relative to the opening 4.

It will be understood that when the spacer 7 is immobilized, the movements of the spacer 7 relative to the opening 4 result from displacement of fender 1 relative to the support 2, namely of the opening 4 relative to the spacer 7.

A mask 11 is provided to cover the opening 4 in its entirety. It has a hole 12 allowing passage of a bolt 13 that also passes through a hole 14 formed in the spacer 7 and is screwed to a nut 2a (shown in FIG. 2) welded to the support 2 below a hole 15. A washer 16 is provided between a head of the bolt 13 and the mask 11 to protect the latter upon tightening.

Figure 2:
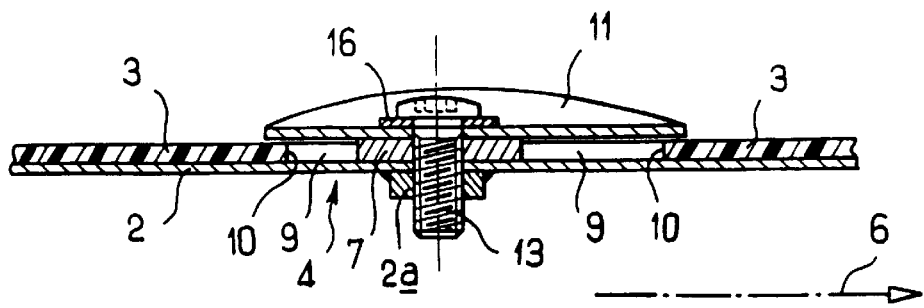
FIG. 2 is a cross-sectional view taken along line II—II in FIG. 1.

FIG. 2 shows an assembly following tightening, where the spacer 7 can be seen to be thicker than the thin wall 3, which holds the mask 11 above the thin wall 3. Thus, the thin wall 3 is free to slide around spacer 7 to allow displacement of the fender 1 relative to the support 2.

Figure 3:
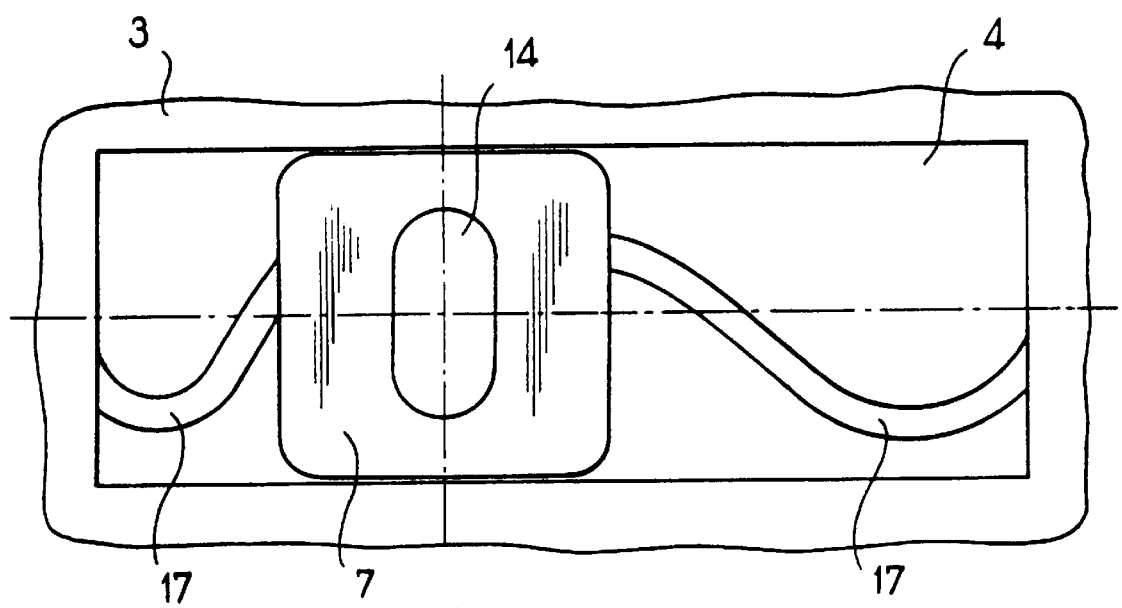
FIG. 3 is a top view on a larger scale of an opening and a spacer of the fender in FIG. 1.

As can be seen in FIG. 3, the spacer 7 is connected to the end edges 10 of the opening 4 by a flexible, sinusoidally shaped arms or links 17 molded simultaneously with the fender 1 and the spacer 7.

The shape of the arms 17 shown here is provided only as an example. Any other shape allowing the spacer 7 to move in the opening 4 would also be appropriate.

The flexible arms 17 ensure pre-positioning of the spacer 7 in a predetermined position in the opening 4 while allowing displacement of the spacer 7 relative to the opening 4 by elastic deformation.

As has already been explained, the predetermined position is such that the spacer 7 can move in a first direction along a relatively short path to compensate for post-shrinkage of the fender 1, and in a second direction, opposite the first, along a longer path, to compensate for the expansion differential.

Figure 4:
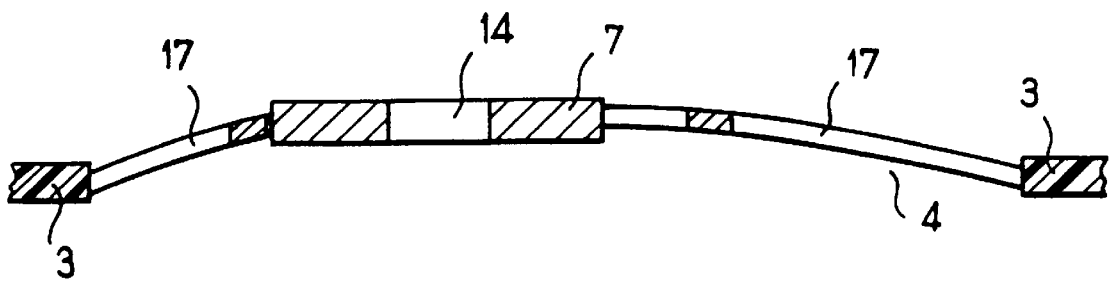
FIG. 4 is a side cross-sectional view of the opening and spacer shown section in FIG. 3.
Figure 6:
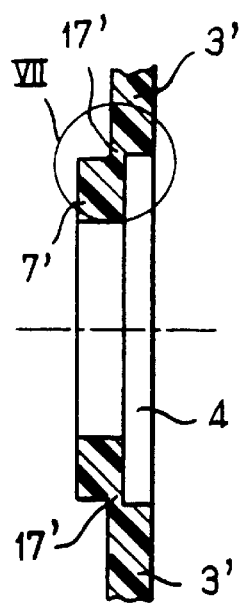
FIG. 6 is a cross-sectional view taken along line VI—VI in FIG. 5.

The spacer 7, which is molded together with the fender 1, is initially positioned outside and opposite the opening, as can be seen in FIG. 4, for reasons of mold configuration, as has already been explained.

The tightening of the bolt 13 causes the spacer 7 to penetrate the opening 4, as shown in FIG. 2.

FIG. 3 also shows that the hole 14 is oblong, allowing the fender to be adjusted in the transverse direction of the automobile.

FIGS. 5–8 show a second embodiment of the present invention wherein a spacer 7', which is substantially identical to spacer 7 of the first embodiment, is initially joined to lengthwise edges 5' by small-cross-sectional areas 17'.

The spacer 7' is initially positioned outside an opening 4', as in the previous embodiment.

When the bolt (not shown) is tightened, the spacer 7' penetrates the opening 4', causing the small-cross-sectional areas 17' to break by shearing.

Figure 5:
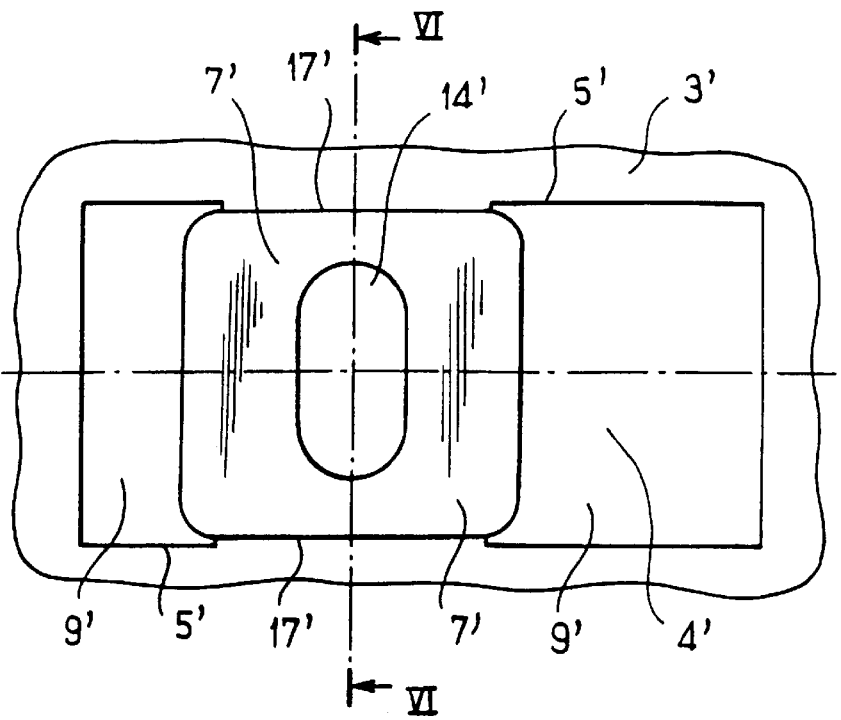
FIG. 5 is a top view of an opening and a spacer of the fender relating to a second embodiment.
Figure 7:
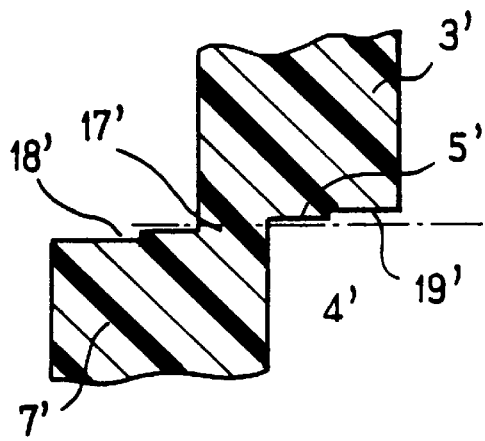
FIG. 7 is an enlarged cross-sectional view of area VII encircled in FIG. 6.
Figure 8:
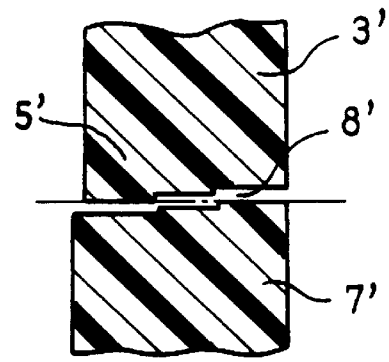
FIG. 8 is a cross-sectional view similar to that of FIG. 7 after the small-cross-section areas have broken.

Detailed views in FIGS. 7 and 8 show that the spacer 7' has a cut-away areas 18' which, in a plane defined along line VI—VI in FIG. 5, reduce its cross section with increasing distance from a thin wall 3'.

Likewise, the cross section of the opening 4', in the same plane along line VI—VI, increases with increasing distance from spacer 7', by means of cut-away areas 19'.

Thus, once the small-cross-sectional areas 17' have sheared, an area of play 8' exists between the spacer 7' and the lengthwise edges 5' to allow relative sliding of the spacer 7' in the opening 4'.

Figure 9:
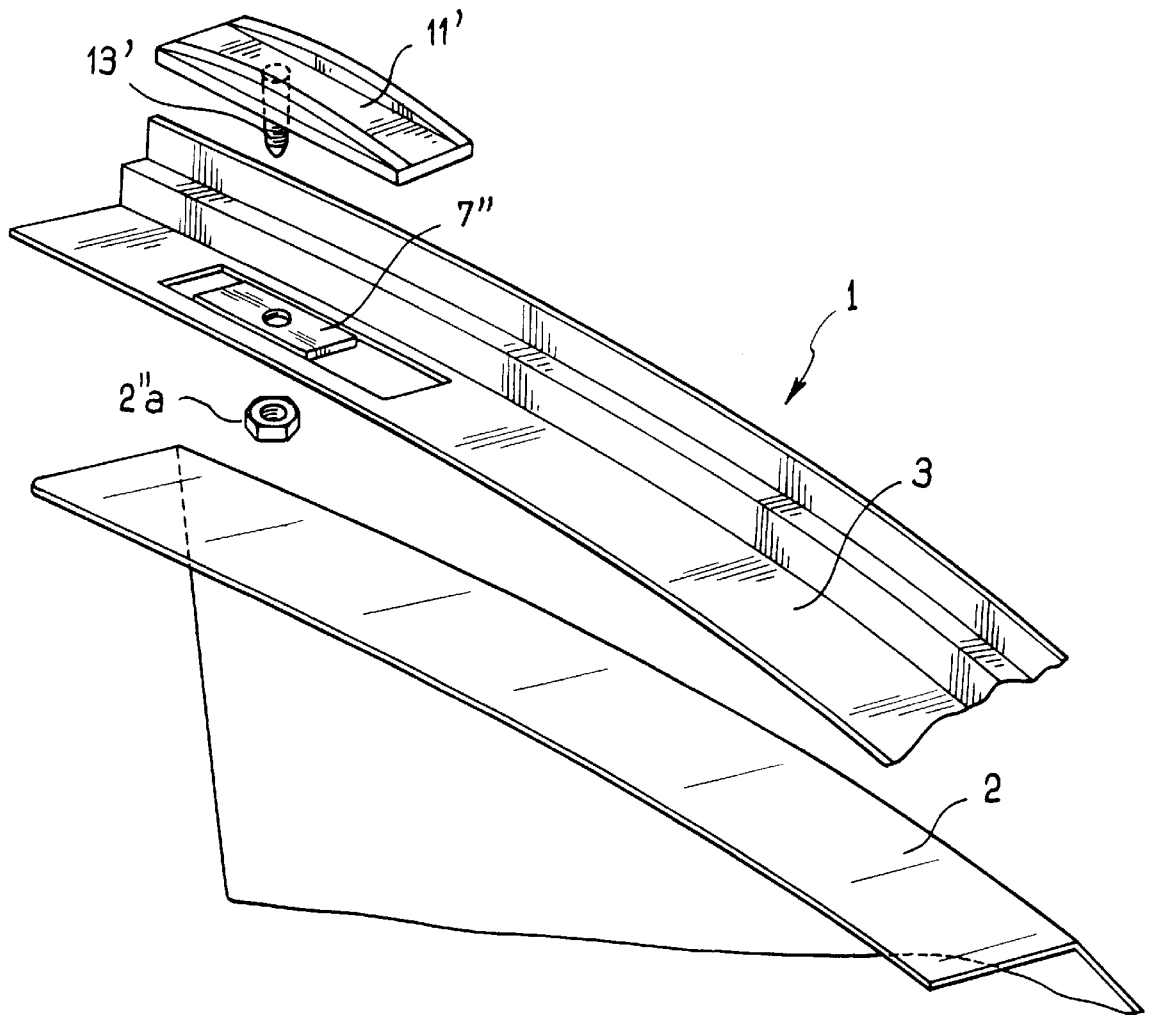
FIG. 9 is a perspective view similar to that of FIG. 1, showing in particular a mask embodiment.

FIG. 9 shows the same upper portion of the front left fender 1, and the same upper portion of the structural part or support 2 for the fender 1.

Spacer 7" is of the same type as that of FIGS. 1 to 4 or of the same type as that of FIGS. 5 to 8.

Mask 11" has an integrated threaded shaft 13" which is able to pass through spacer 7" and the support 2 to receive a nut 2"a which is not welded to the support 2, so that it can be screwed to the threaded shaft 13" that is rotationally immobilized by the mask 11", at least when screwing is complete, when the mask 11" begins to compress the spacer 7".

The threaded shaft 13" can, for example, be integrated as an insert into the mask 11" when the latter is molded.

It goes without saying that the embodiments described above are not limiting in nature and can undergo any desirable modification without thereby departing from the scope of the invention.

In particular, it is clear that the nut 2a, even when intended for the bolt 13 that is free relative to the mask 11, can be free relative to the support 2 and not welded thereto.

What is claimed is:

1. A plastic part having at least one thin wall having an elongate through-opening, defined by two lengthwise edges extending parallel to each other at least over part of their length, the plastic part further comprising:
   a spacer having a thickness greater than that of the thin wall and capable of sliding in said opening between the two lengthwise edges thereof, said spacer being initially formed as one piece with the thin wall by one of deformable links or breakable links;
   said links being or break when the plastic part is affixed on a support.

2. The plastic part according to claim 1, wherein the spacer is initially located outside said opening but opposite said opening in order to occupy said opening when the plastic part is mounted onto the support.

3. The plastic part according to claim 1, wherein the breakable links include small-cross-sectional areas connecting said spacer to lengthwise edges of said opening such that, when the plastic part is connected to the support, said areas break by shearing.

4. The plastic part according to claim 1, wherein the deformable links connecting said spacer to the thin wall include flexible arms connecting said spacer to opposing ends located furthest apart from within said opening.

5. The plastic part according to claim 4, wherein the flexible arms hold said spacer in a predetermined position inside said opening when the plastic part is not connected to the support, said predetermined position being such as to allow post-shrinkage of the plastic part to be compensated in one direction and the expansion differentials between the plastic part and the support to be compensated in an opposite direction.

6. The plastic part according to claim 1, wherein said spacer provides a bearing surface for the holding means to tighten against said bearing surface, said bearing surface being sufficient to prevent creep of said spacer, even when the temperature of said spacer rises.

7. The plastic part according to claim 1, wherein the means for holding said spacer to the support while keeping said spacer inside said opening includes a substantially plane mask able to cover said opening in its entirety and be tightened against said spacer by a tightening element anchored in the support.

8. The plastic part according to claim 7, wherein the tightening element is a threaded shaft integrated with said mask.

9. A plastic part according to claim 1, wherein the plastic part is a body part of an automobile.

10. A plastic part having at least one thin wall having an elongate through opening, defined by two lengthwise edges extending parallel to each other at least over part of their length, the plastic part further comprising a spacer having a thickness greater than that of the thin wall and capable of sliding in said opening between the two lengthwise edges thereof, said spacer being initially formed as one piece with the thin wall by small cross-sectional areas connecting the spacer to the lengthwise edges of said opening, said areas being able to break when the plastic part is affixed on a support.

* * * * *